United States Patent
Kallabis

(10) Patent No.: US 9,513,121 B2
(45) Date of Patent: Dec. 6, 2016

(54) DEVICE FOR CAPTURING A LASER BEAM

(75) Inventor: Gabriel Kallabis, Spirkelbach (DE)

(73) Assignee: STABILA MESSGERATE GUSTAV ULLRICH GMBH, Annweiler (DE)

( * ) Notice: Subject to any disclaimer, the term of this patent is extended or adjusted under 35 U.S.C. 154(b) by 928 days.

(21) Appl. No.: 13/095,067

(22) Filed: Apr. 27, 2011

(65) Prior Publication Data

US 2011/0266425 A1   Nov. 3, 2011

(30) Foreign Application Priority Data

Apr. 29, 2010   (DE) .................... 20 2010 005 327 U

(51) Int. Cl.
| | |
|---|---|
| H01J 40/14 | (2006.01) |
| G01C 15/00 | (2006.01) |
| B23K 26/02 | (2014.01) |
| B23K 26/00 | (2014.01) |
| F16M 13/00 | (2006.01) |

(52) U.S. Cl.
CPC ......... *G01C 15/006* (2013.01); *B23K 26/0096* (2013.01); *B23K 26/02* (2013.01); *F16M 13/00* (2013.01)

(58) Field of Classification Search
CPC ... B23C 26/0096; B23C 26/02; G01C 15/006; G01C 15/00; H01J 40/14; B25B 1/24; B25B 1/2405; B25B 1/2431; B25B 5/16; B25B 5/163; F16M 13/00
USPC ............................ 250/239, 216; 33/290–296
See application file for complete search history.

(56) References Cited

U.S. PATENT DOCUMENTS

| | | | |
|---|---|---|---|
| 3,861,664 A | 1/1975 | Durkee | |
| 4,270,721 A | 6/1981 | Mainor, Jr. | |
| 5,756,987 A * | 5/1998 | Kamataki | 250/206.2 |
| 6,209,832 B1 * | 4/2001 | Yamazaki | 248/230.6 |
| 6,398,175 B1 * | 6/2002 | Conner et al. | 248/228.3 |

(Continued)

FOREIGN PATENT DOCUMENTS

| | | |
|---|---|---|
| CN | 101275833 A | 10/2008 |
| CN | 101408619 A | 4/2009 |

(Continued)

OTHER PUBLICATIONS

Chinese Search Report issued Feb. 7, 2014, corresponding to Chinese Patent Application No. 2011101876368.

*Primary Examiner* — Georgia Y Epps
*Assistant Examiner* — Kevin Wyatt
(74) *Attorney, Agent, or Firm* — Ladas & Parry LLP

(57) ABSTRACT

The invention relates to a device for capturing a laser beam, comprising a receiver unit having a housing with a front surface, along one side of which a measurement region capturing the laser beam that comprises a sensor associated therewith runs, and a mounting (24), which can be detachably connected to the housing and comprises a preferably polygonal column-shaped base body and clamping jaws (30, 32). To allow the receiver to be oriented with respect to both a horizontal laser beam and a laser beam that is inclined with respect to the horizontal, using the mounting that can be detachably connected to the housing, the base body has a trapezoidal geometry comprising an outer longitudinal lateral surface, along which outer surfaces of the clamping jaws (30, 32) run, which overall form a support surface of the mounting on a base when the housing is oriented at an incline with respect to the vertical.

20 Claims, 9 Drawing Sheets

(56) References Cited

U.S. PATENT DOCUMENTS

Figure 1:
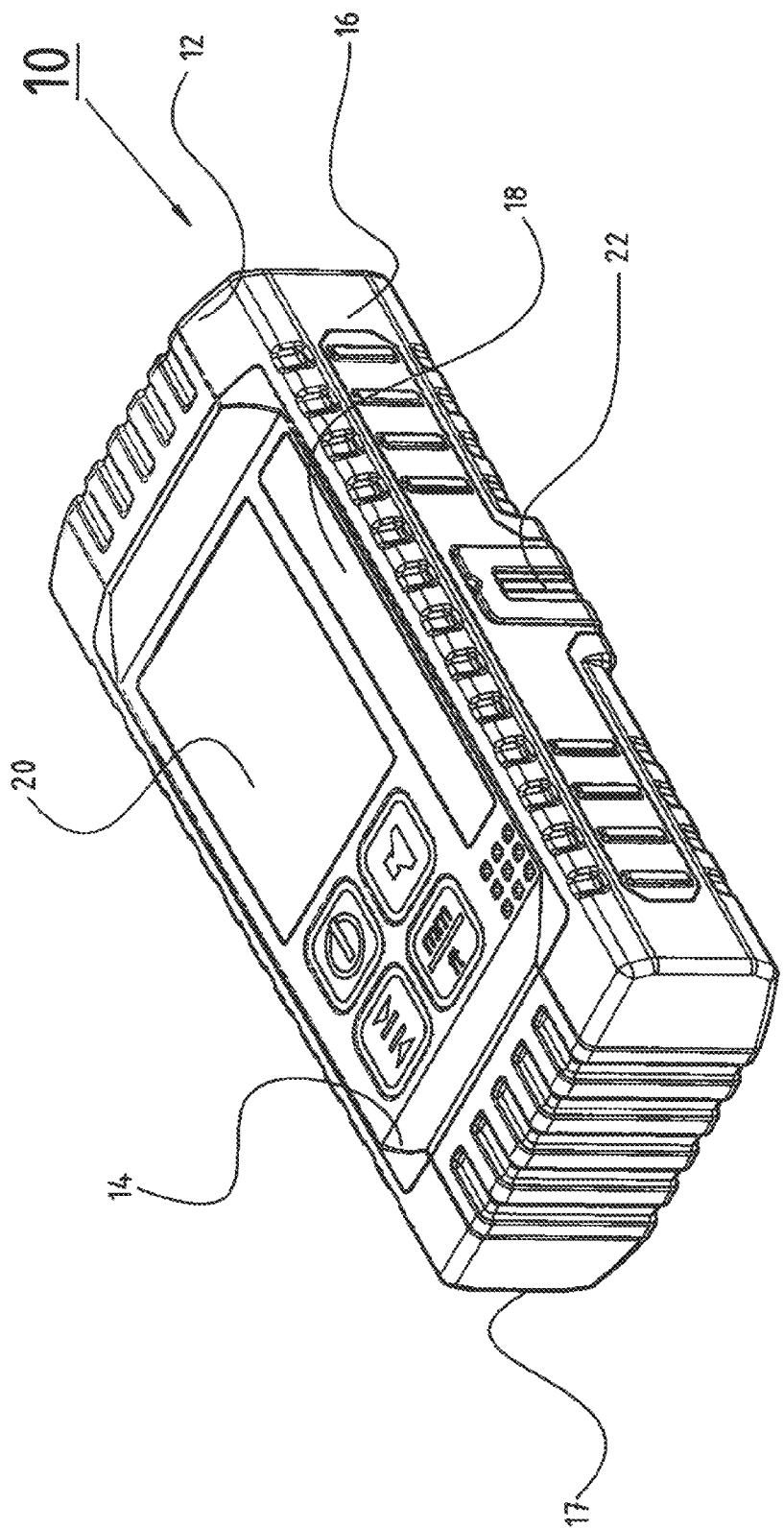

| | | |
|---|---|---|
| 7,414,704 B1 * | 8/2008 | Nau .............................. 356/4.08 |
| 2005/0280802 A1 * | 12/2005 | Liu ............................... 356/5.01 |
| 2008/0296454 A1 * | 12/2008 | Carnevali ................. 248/231.71 |
| 2010/0131237 A1 * | 5/2010 | Pamatmat .............. G01C 15/06 <br> 702/159 |
| 2011/0235053 A1 * | 9/2011 | Campagna .................... 356/614 |

FOREIGN PATENT DOCUMENTS

| | | |
|---|---|---|
| DE | 19809683 | 9/1999 |
| DE | 19814149 | 10/1999 |
| JP | 2005227061 A | 8/2005 |
| JP | 2006126102 | 5/2008 |
| WO | WO 2010069734 A1 * | 6/2010 |

* cited by examiner

DEVICE FOR CAPTURING A LASER BEAM

The invention relates to a device for capturing a laser beam, preferably a laser beam spanning a plane, comprising a receiver unit having a housing with a front surface, along one side of which, in particular a longitudinal lateral surface, a measurement region capturing the laser beam that comprises a sensor associated therewith runs, and a mounting, which can be detachably connected to the housing and comprises a preferably polygonal column-shaped base body and clamping jaws, which can be adjusted relative to one another and have clamping surfaces parallel to one another, which run parallel to a first face of the base body or a section of the base body that forms a support surface.

To detect the laser beam center of a rotating laser or the line center of a line laser, receivers are used, which comprise a housing having a linear sensor extending along a longitudinal side for capturing the laser light. To this end, the housing, and hence the sensor, must be oriented with respect to the laser radiation so that the laser light intersects the sensor or measurement line perpendicularly and centrally. A display on the front surface indicates when the center of the receiving zone of the sensor has been reached. This region is associated with a marker or notch in a longitudinal side of the housing, so as to be able to mark the determined plane.

The housing can be cuboid or composed of sections that have rounded edges in some regions. However, the housing should comprise at least two edges on the outside that form a right angle. These edges preferably run along an end face and a longitudinal side.

Appropriate receivers are held against walls by hand, for example, and displaced until the positions of the sensor and laser beam are exactly aligned.

It is also possible to fasten appropriate receivers, which is to say, the housings thereof, by means of a retaining bracket to leveling rods or simple wooden slats, for example, to capture a horizontal plane spanned by a laser beam. The measurement line or the line sensor then runs vertically.

Appropriate receivers can likewise be used to capture vertical planes. To determine the laser beam, the receiver is then held at an incline to be able to read the display. The angle of inclination, however, must be designed in relation to the horizontal such that the laser light can be detected, because the sensor is generally offset toward the back with respect to the surface, whereby shadowing is generated between the upper face of the housing and the receiving line. It is therefore not possible in general to place the housing on the ground, which is frequently irregular, and to dispose the receiver directly beneath the laser source.

It is also disadvantageous that rocking occurs if no mounting is used, or the receiver is held manually, so that it is frequently not possible to reliable capture the laser beam.

A receiver of the type mentioned above is disclosed in U.S. Pat. No. 6,398,175. The mounting, which can be detachably connected to the receiver housing, is designed so that the mounting is fastened to a pipe. For this purpose, an inner clamping jaw, which can be displaced by means of an outer clamping jaw, is provided with an inclined contact surface, which ensures secure clamping to a pipe.

A dual-axis laser measuring device is known from DE-C-198 14 149, the housing of which can be connected to a stand. To this end, the stand can be positioned on an inclined surface. The stand should offer the possibility to vertically align the housing.

U.S. Pat. No. 4,270,721 relates to an instrument support and comprises a U-shaped clamp, by means of which sleeves that can be telescoped inside one another can be fixed.

A surveying device is disclosed in JP-A-2006 12 61 02, which is associated with a receiver device that can be adjusted along a square bar.

It is the object of the present invention to further develop a device of the type mentioned above so that the receiver, and hence the housing, can be oriented with respect to both a horizontal laser beam and a laser beam inclined in relation to the horizontal, using the mounting that can be detachably connected to the housing, without manual holding taking place.

To achieve the object, according to the invention substantially the base body comprises first, second and third outer longitudinal lateral surfaces that are perpendicular to the first face or the support surface, the clamping jaws can be adjusted along the first outer longitudinal lateral surface, the clamping jaws comprise first outer surfaces transversely to the clamping surfaces, with these first outer surfaces running along the second outer longitudinal lateral surface of the base body, the respective first outer surface or protrusions of the respective first outer surface of the clamping jaws run in a plane that is spanned by the second outer longitudinal lateral surface of the base body or run parallel thereto, the third outer longitudinal lateral surface adjacent to the second outer longitudinal lateral surface forms an acute angle with the second outer longitudinal lateral surface and forms the contact surface for the rear lateral surface of the housing when the mounting is detached from the housing.

The invention is further characterized in that a stop element comprising a stop surface extends from the base body, this stop surface being perpendicular to the first face of the base body or the support surface and delimited thereby, and when the housing is connected to the mounting, the front surface or opposing rear lateral surface rests against the stop surface, and rests with a longitudinal lateral surface against the first face or the support surface, and can be fixed by means of a fastening means extending from the stop element.

According to the invention, the mounting is used to allow the housing to be oriented in the customary fashion so that a horizontal laser beam is captured, wherein the housing can be fixed by means of the clamping jaws extending from the mounting. If a laser beam that deviates from the horizontal, notably a vertically oriented laser beam, is to be captured, the mounting can be placed on a base, such as a floor surface, by means of the outer surface of the clamping jaws running in a plane and the first and second outer lateral surfaces of the base body, which in this way provide support for the mounting, so as to then place the housing with the rear lateral surface thereof on the third outer lateral surface of the base body extending at an incline with respect to the support, so that unambiguous and static positioning of the receiver is assured. In particular the ledge or protrusion in the transition between the second and third outer lateral surfaces ensures that the housing is not only securely seated, but that it also does not have contact with the base.

The mounting serves as support and holds the housing in a defined inclined position.

In the sectional view, the base body preferably substantially has a non-isosceles trapezoid geometry with the first outer lateral surface as the first lateral leg, the second outer lateral surface as the long base, and the third outer lateral surface as the second lateral leg.

The angle between the first and second outer lateral surfaces should preferably range between 20° and 70°, and more preferably between 30° and 60°.

According to an independent solution according to the invention, a device is provided for capturing a laser beam, preferably a laser beam spanning a plane, comprising a receiver unit having a housing with a front surface, along one side of which, in particular a longitudinal lateral surface, a measurement region capturing the laser beam that comprises a sensor associated therewith runs, and a mounting, which can be detachably connected to the housing and comprises a preferably polygonal column-shaped base body and clamping jaws, which can be adjusted relative to one another and have clamping surfaces parallel to one another, which run parallel to a first face of the base body or a section of the base body that forms a support surface, characterized in that a stop element comprising a stop surface extends from the base body, the stop surface being perpendicular to the first face or the support surface and delimited thereby, in a first position the housing rests with the front surface, or the rear lateral surface of the housing opposite thereof, against the stop surface and rests with a longitudinal lateral surface against the first face or the support surface and can be fixed by means of a fastening means extending from the stop element, and in a second position a lateral face of the housing can be connected to the stop surface so that the front surface of the housing is at an incline with respect to the clamping surfaces of the clamping jaws.

The base body preferably has a hollow cube geometry comprising an open longitudinal side, along which the clamping jaws can be adjusted relative to one another.

According to the invention, in particular at least two protrusions extend from the stop surface, which are associated with recesses in the face side of the housing, wherein the recesses preferably run along a first straight line and the protrusions run along a second straight line, wherein the straight lines are oriented with respect to one another so that the front surface of the housing is inclined with respect to the clamping surfaces of the clamping jaws when the protrusions engage with the recesses. To this end, the first straight line can be inclined with respect to the front surface of the housing.

According to the invention, the housing of the receiver is connected to the mounting when capturing both a horizontal laser beam and a laser beam that is inclined with respect to the horizontal, wherein the housing can likewise be rigidly connected to the mounting when a laser beam that is perpendicular with respect to the horizontal is captured. To this end, there is the possibility to provide a recess having an internal thread, such as a blind hole, in the face with which the protrusions of the stop element engage, with a screw element that penetrates the stop element engaging with this blind hole. In this way, the housing cannot shift in relation to the mounting.

The invention is further characterized in that the marking, which runs in the known fashion in at least one longitudinal lateral surface of the housing and perpendicular to the front surface and the sensor, is surrounded by a marking element, which can be folded out of the longitudinal lateral surface and in turn enables simple orientation of the housing with respect to the laser beam to be detected.

Embodiments of the invention will be apparent from the dependent claims.

Further details, advantages, and characteristics of the invention will not only be apparent from the claims and the characteristics disclosed therein—either alone and/or in combination with one another—but also from the following description of an embodiment disclosed in the drawings.

Figure 2:
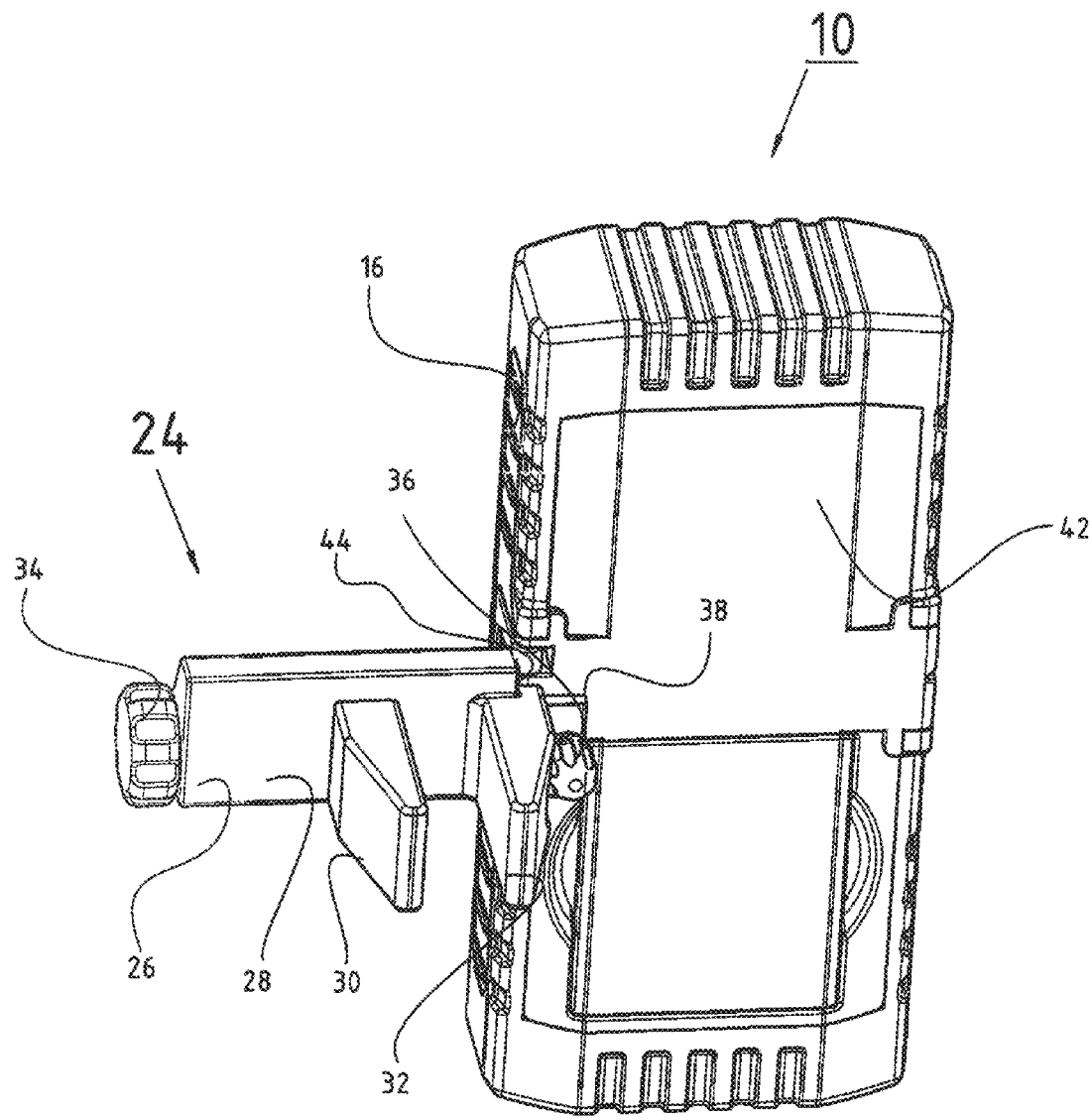
Figure 3:
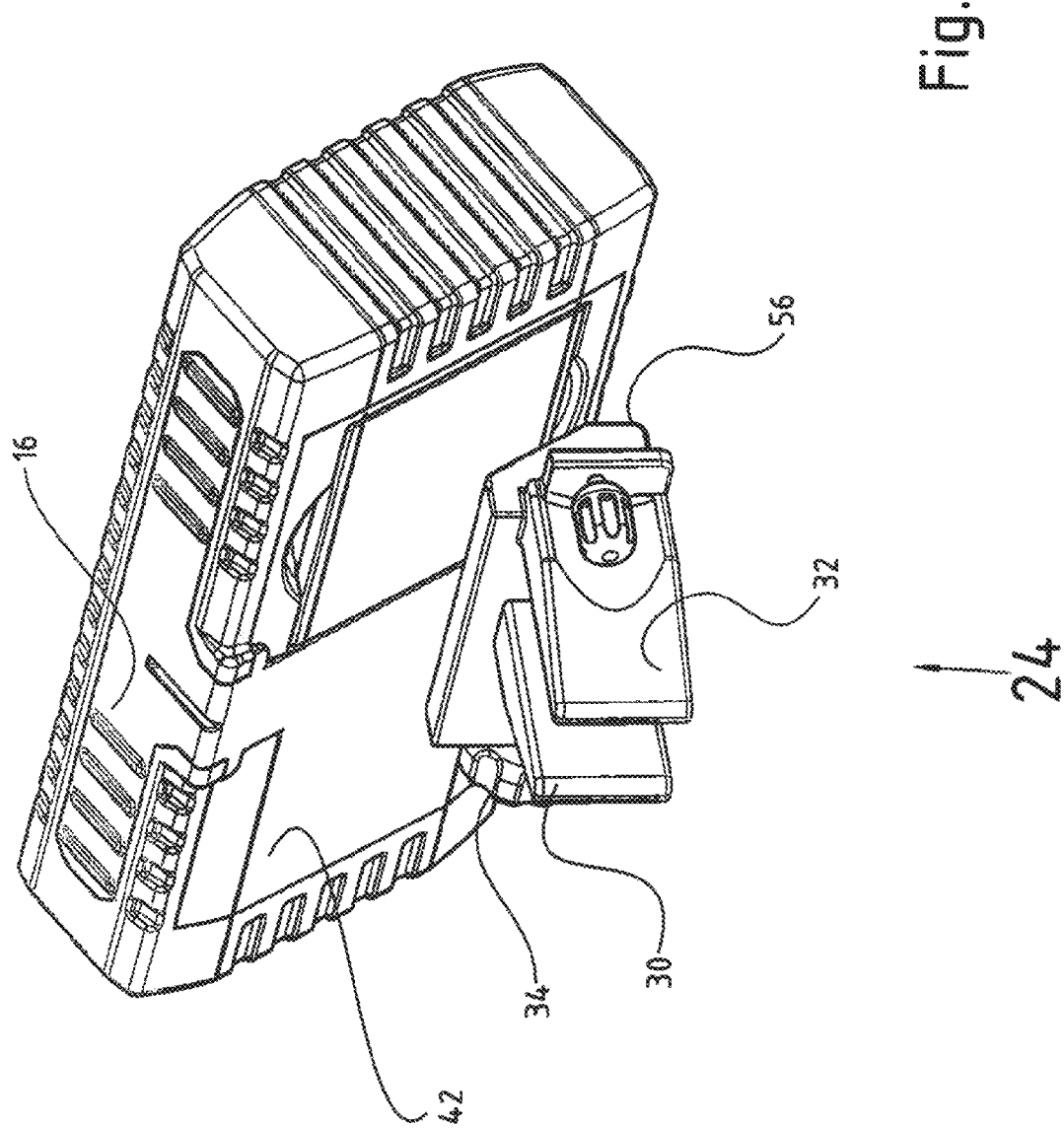
Figure 4:
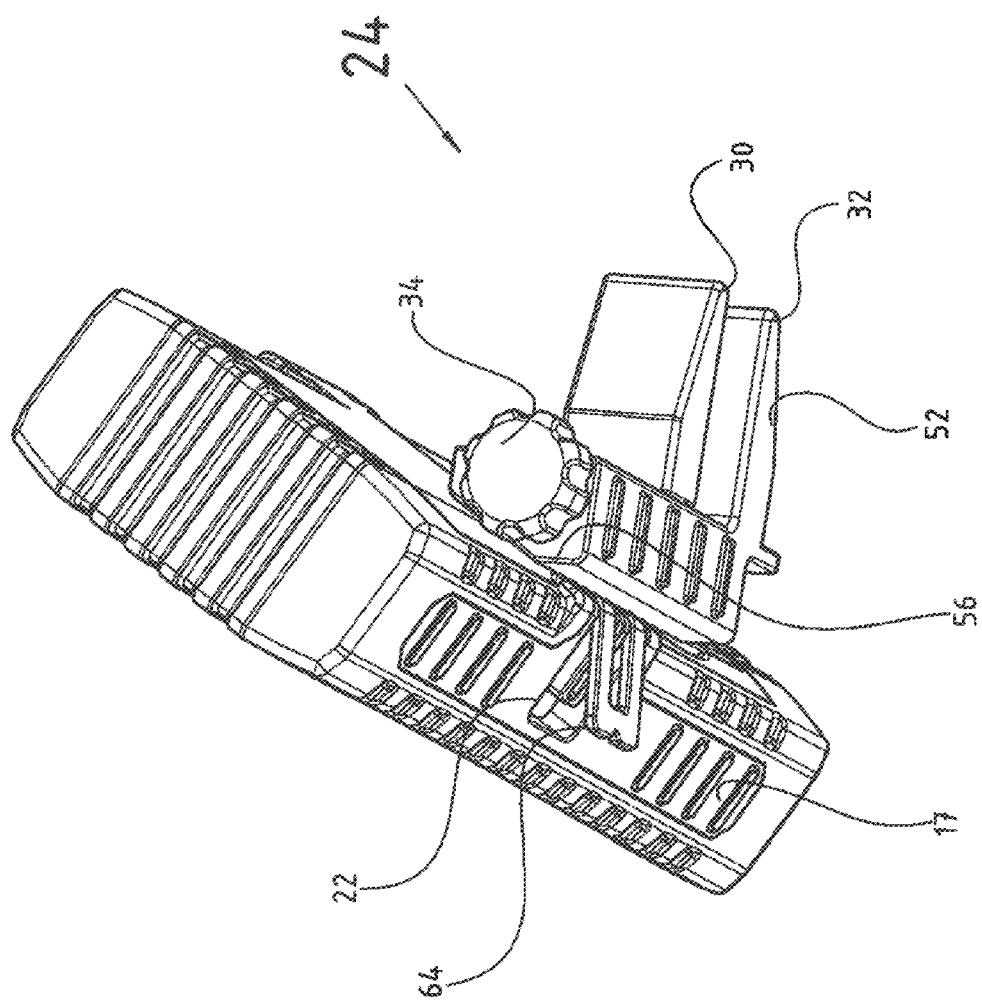
Figure 5:
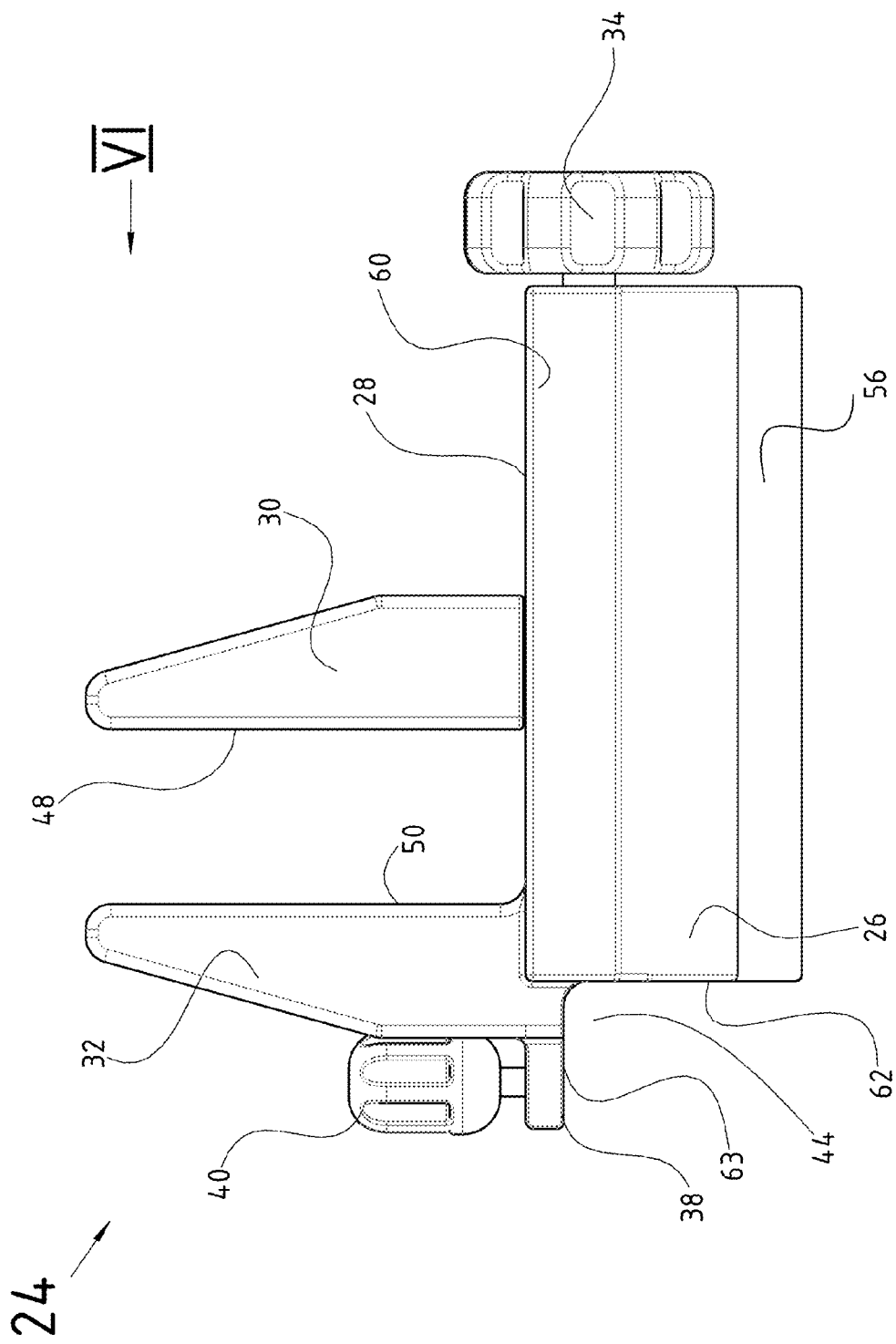
Figure 6:
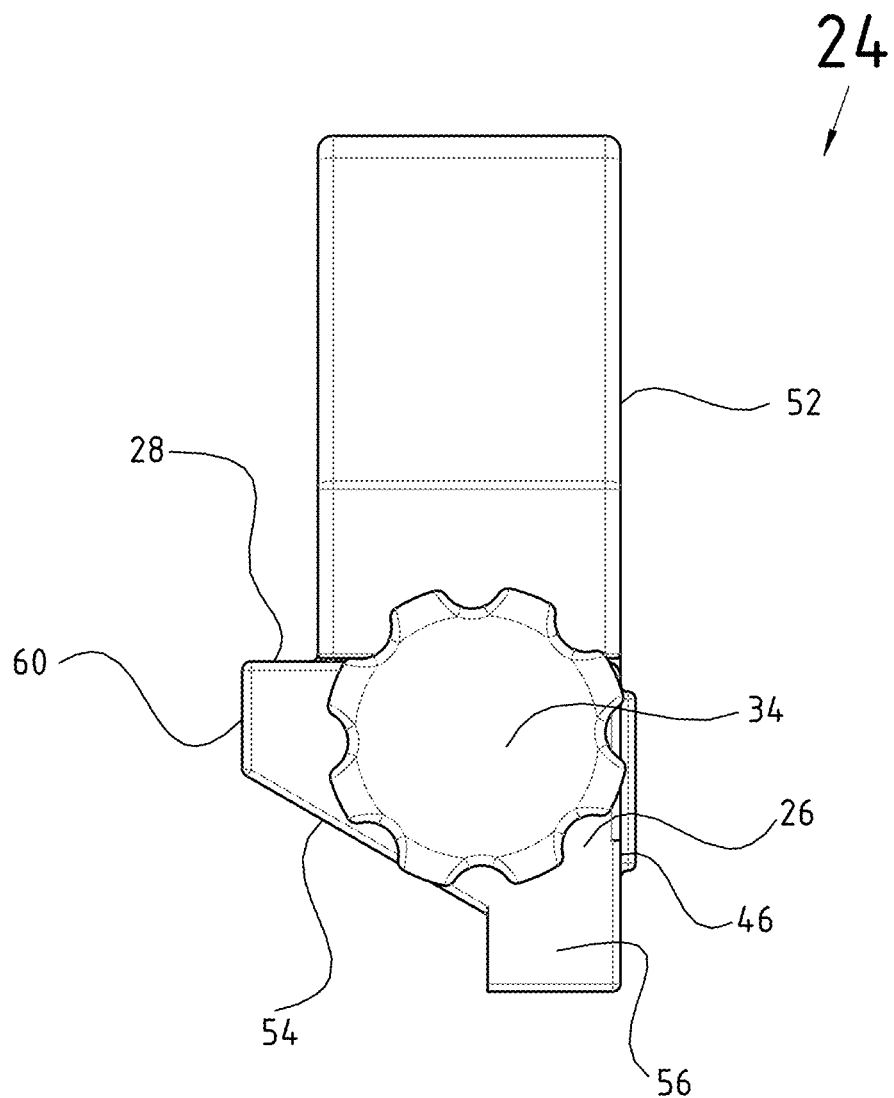
Figure 7:
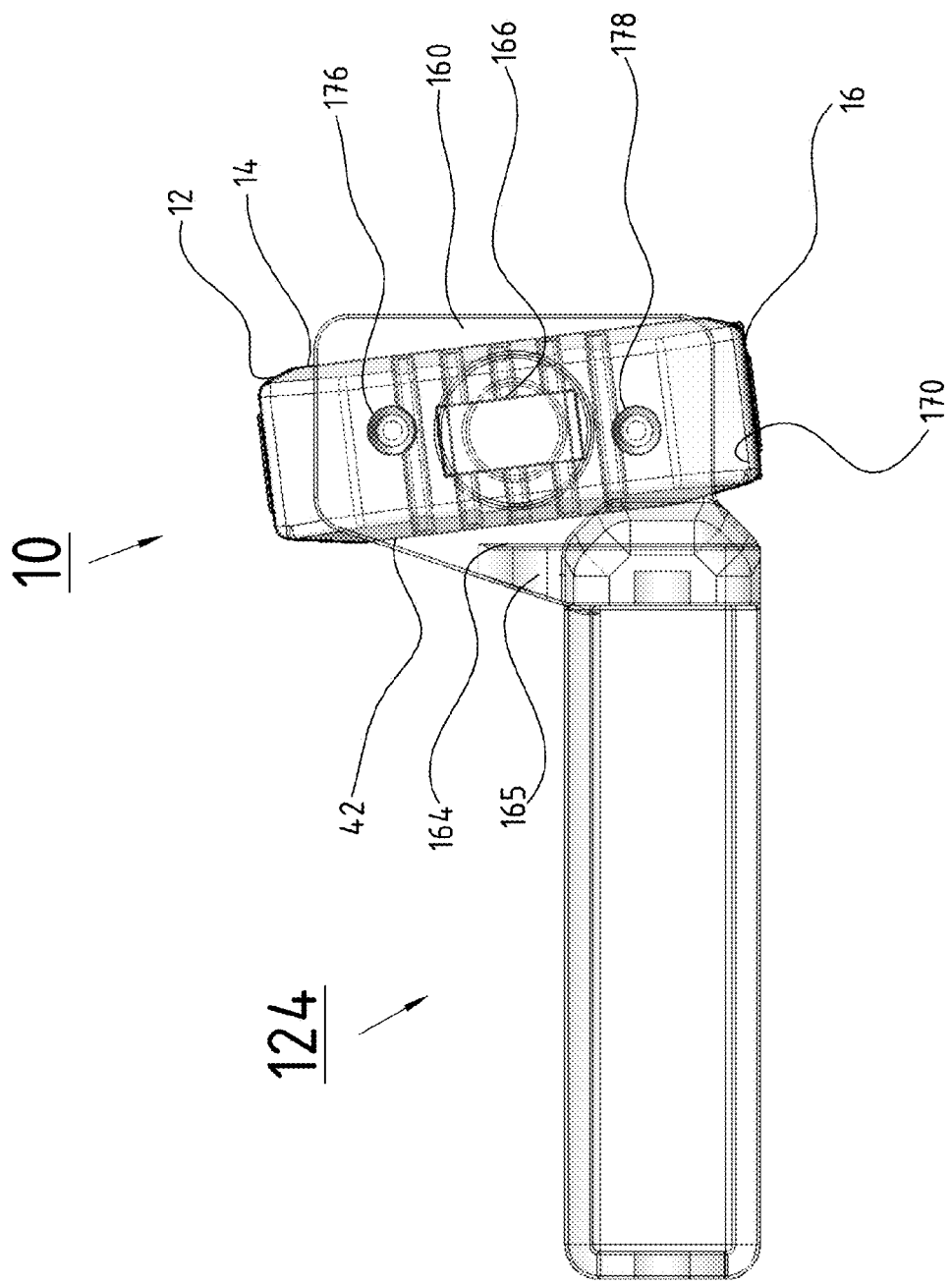
Figure 8:
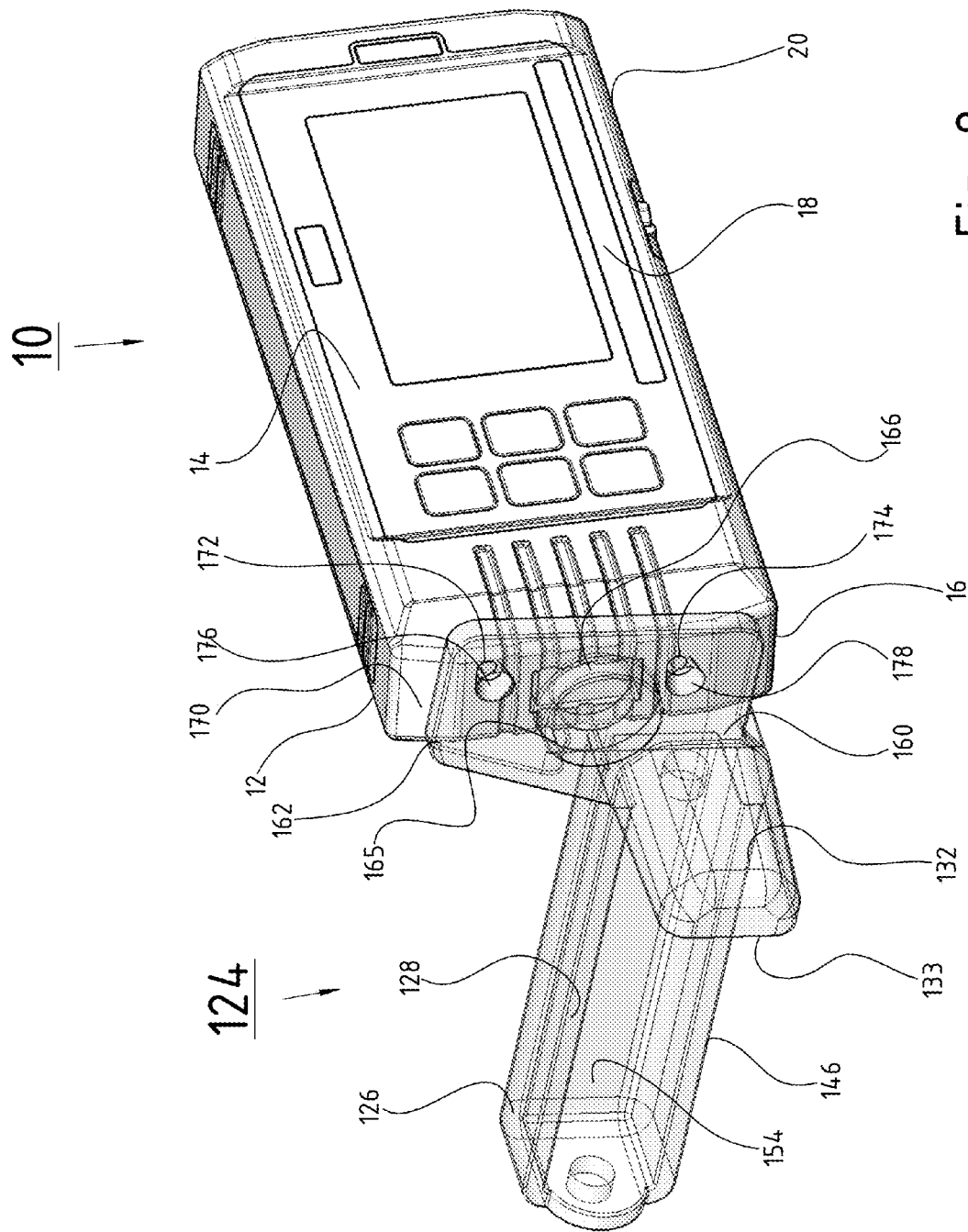
Figure 9:
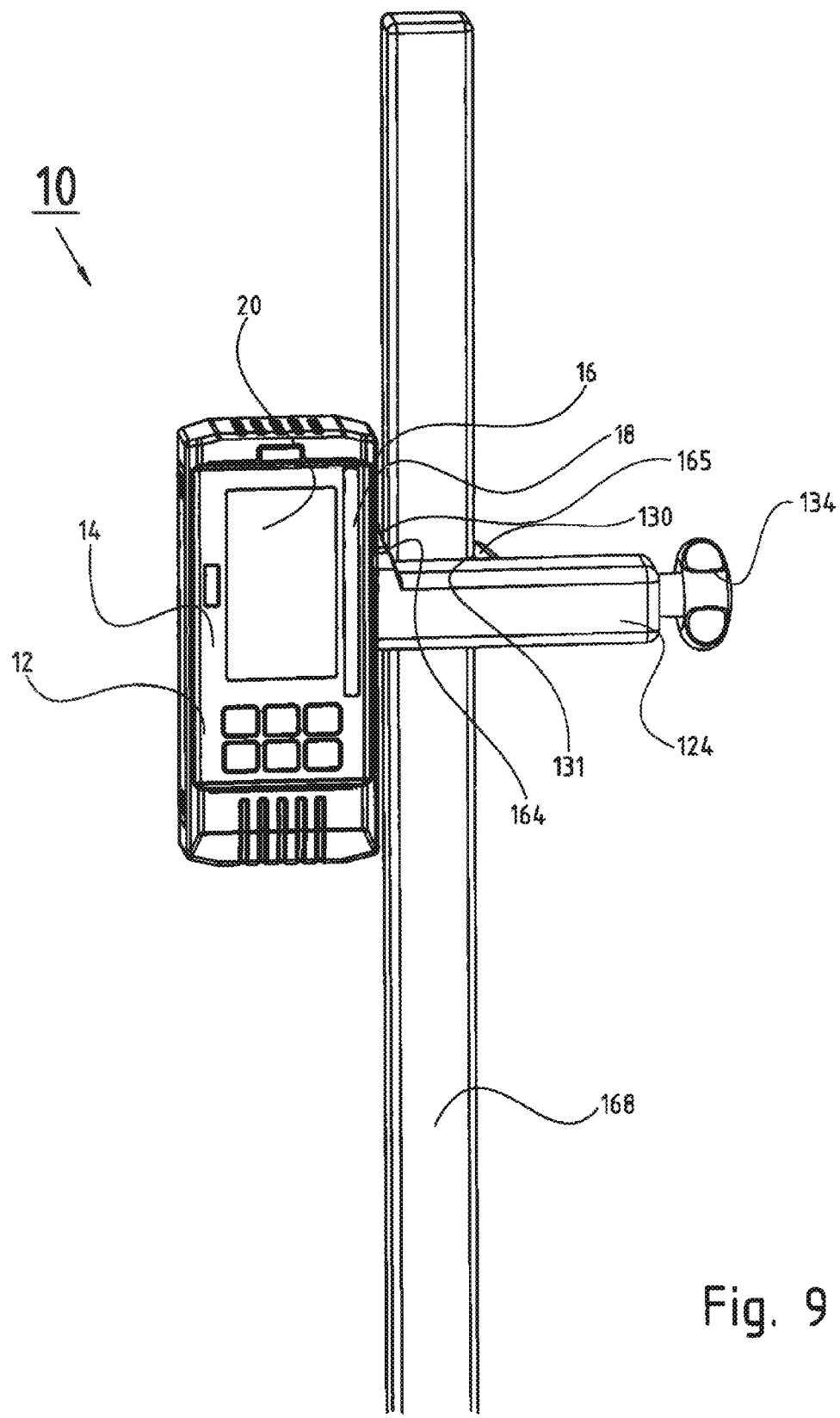

In the figures:

FIG. 1 is a measuring device for receiving laser radiation,

FIG. 2 is the measuring device according to FIG. 1, comprising a mounting for measuring a horizontal laser beam, FIG. 3 is the measuring device according to FIG. 1, comprising the mounting according to FIG. 2, in the usage position of the measuring device for measuring a laser beam spanning a vertical plane, FIG. 4 is a variant of the illustration corresponding to FIG. 3, FIG. 5 is a front view of the mounting according to FIGS. 2 to 4, FIG. 6 is the mounting according to FIG. 5 in view VI, FIG. 7 is a side view of a second embodiment of a mounting connected to a measuring device, FIG. 8 is a perspective illustration of the measuring device comprising the mounting according to FIG. 7, and FIG. 9 is the measuring device comprising the mounting according to FIGS. 7 and 8 while capturing a laser beam in a horizontal plane.

The figures show a receiver unit 10, which is known per se, for capturing a laser beam, which can originate from a rotating laser or a line laser. The receiver unit 10 measures the position of the plane spanned by the laser beam. For this purpose, the receiver unit 10, which in the drawing has a cuboid housing 12, comprises a linear receiving region 18 in the front surface 14 and along the right longitudinal side 16 in the drawing, with an appropriate sensor, which is offset toward the back in relation to the upper face of the front surface 14, extending beneath the receiving region. Moreover, a display 20 is located in the front surface 14. It indicates how far removed the laser beam is from the center of the receiving region 18, so as to then accordingly orient the housing 12. A linear marking 22 is oriented in the longitudinal lateral surfaces 16, 17 with respect to the center of the receiving region, wherein the marking can be used to mark on a base, such as the wall or the ground, where the laser beam meets with the base when the receiver unit 10 is properly positioned in relation to the laser beam. As has been mentioned, these are design and configuration measures that are part of the prior art.

While the housing 12 is shown to have a cuboid shape, this shall not limit the teaching according to the invention. The housing can rather have any desired outside geometry. However, the housing should comprise at least two edges that form a right angle, which preferably extend along an end face and a longitudinal side of the housing. The respective edges serve as contact or marking aids.

Moreover, it is customary for the housing 12 to be connected to a mounting, by means of which the housing 12 is fastened, for example, to a leveling rod or other object such as a wooden slat, when a horizontal plane that is spanned by laser radiation is to be captured.

A corresponding usage position of the measuring device 10 is shown in FIG. 2. It is apparent that the housing 12 is connected to a mounting 24, which comprises a base body 26 and clamping jaws 30, 32 that can be displaced relative to one another along a first outer longitudinal side 28. In the illustration of FIG. 2, the left clamping jaw 30 can be adjusted by means of a screw element, such as a tommy screw 34. The base body 26 as such, and hence the mounting 24, can be connected to the housing 12 by means of a fastening screw 36, which penetrates a section 38 that extends from the right jaw 32. The thread of the screw 36 engages with a corresponding internal thread provided in the rear 42 of the housing 12.

To ensure unambiguous orientation between the mounting 24 and the housing 12, a step 44, which rests, on one side, against the longitudinal lateral surface 16 comprising the marking 22 and, on the other side, against the rear lateral surface 42, extends between the base body 26 and the jaw 32 protruding the same laterally. The step 44 is delimited by a stop surface 63 and face 62 of the base body 26. Instead of the face 62, it is also possible to provide a corresponding support surface.

As is shown in the illustrations in FIGS. 5 and 6, the base body 26 is composed of a body in the shape of a polygonal column having a trapezoid geometry in the sectional view. In addition to the first outer longitudinal lateral surface 28, from which the jaws 30, 32 extend, the base body 26 comprises a second outer longitudinal lateral surface 46, which is perpendicular to the first outer longitudinal lateral surface 28.

The illustrations in FIGS. 5 and 6 further show that the clamping jaws 30, 32 have clamping surfaces 48, 50, which are perpendicular to the first outer longitudinal lateral surface 28 and hence perpendicular to the front surface 14 of the housing 12.

The jaws 30, 32 have first outer surfaces 52, which extend in a plane spanned by the second outer longitudinal lateral surface 46 of the base body 26. Of course it is also possible for the outer surfaces 52 of the jaws 30, 32 to be offset toward the back with respect to the outer longitudinal lateral surface 46, or for protrusions to extend from the outer surfaces 52, which in turn run in the plane spanned by the outer longitudinal lateral surface 46, without thereby departing from the teaching according to the invention.

Adjoining the second outer longitudinal lateral surface 46 is a third outer longitudinal lateral surface 54 forming an acute angle therewith, for example between 20° and 70°, and more particularly between 30° and 60°, wherein in the transition region between the second and third outer longitudinal lateral surfaces 46, 54 a longitudinal ledge 56 extends, by which in accordance with the illustrations according to FIGS. 3 and 4 the housing 12 is positioned on the mounting 24, which is to say, the edge region between the rear lateral surface 42 and one of the longitudinal lateral surfaces 16 or 17 rests on the ledge 56. In this case, the housing 12 is unambiguously positioned, so that secure orientation of the receiving region 18 with respect to the laser beam to be measured can take place.

The ledge 56 can, of course, also be formed by other similarly acting elements, such as two or more protrusions. In addition, it is possible for the rear lateral surface 42 of the housing 12 to comprise one or more depressions, which are geometrically adapted to the longitudinal ledge 56, or perform the same function, so as to enable proper positioning of the housing 12 when the same is positioned at an incline.

As is shown in the illustration according to FIG. 6, the base body 26, in the sectional view, has a non-isosceles trapezoid geometry, wherein the first and third outer longitudinal lateral surfaces 28, 54 form the lateral legs and the second outer longitudinal lateral surface 46 forms the longer base. The remaining outer lateral surface 60 forms the shorter base.

Because of the design according to the invention, the housing 12 is oriented with the rear side 42 thereof toward the left face 62, in the illustration of FIG. 5, of the base body 26 of the mounting 24, so as to capture a laser beam spanning a horizontal plane. In addition, with a mounting 24 that is placed on a base such as floor, the housing 12 is placed with the rear side 42 thereof on the third outer longitudinal lateral surface 54 of the base body 26, wherein the second outer longitudinal lateral surface 46 with the outer surfaces 52, or protrusions of the jaws 30, 32 extending therefrom, form a support of the mounting 24 with respect to a base.

In this way, according to the illustration shown in FIGS. 3 and 4, the housing 12, and hence the measurement region 18, can be oriented with respect to a laser beam spanning in particular a vertical plane and the beam can be measured, without requiring the housing 12 as such to be held manually.

To mark the laser radiation, once the same strikes the center of the measurement region, a fold-out marking element 64 (see FIG. 4) is provided, which surrounds the marking 22 present in the outer lateral surface 16 or 17. In this way, by pivoting the marking element 64, which may comprise a notch or other marking corresponding to the position of the marking 22, the position of the measured laser beam can be indicated on the base.

FIGS. 7 to 9 show a second embodiment of a mounting 124 to be able to orient a measuring device 10 corresponding to FIGS. 1 to 6 in the desired orientation with respect to a laser beam. For this reason, the same reference numerals as in FIGS. 1 to 6 are used for the measuring device 10.

The mounting 124 comprises a base body 126 having a hollow cube geometry, wherein clamping jaws 130, 132 can be displaced relative to one another along the open side 128, which forms a first longitudinal side. In keeping with FIGS. 1 to 6, one of the clamping jaws is designed to be integral with the base body 124, which in the embodiment is the clamping jaw 132.

The clamping jaws 130, 132 can be adjusted parallel to the first longitudinal side 128, and hence with respect to the bottom wall 154 of the mounting 124. Parallel to the adjustment path of the clamping jaws 130, 132, and in the embodiment hence with respect to the bottom wall 154 and the first longitudinal side 128, a stop element 160 extends from the base body 124, this stop element having a plate-like design and providing a stop surface 162, which runs on the side of the stop element 160 facing away from the clamping jaws 130, 132. The stop surface 162 runs at a right angle with respect to both the clamping surfaces 131, 133 of the clamping jaws 130, 132 and a support surface 164 of a second stop element 165, which can optionally also form a section of a face of the base body 126. The support surface 164 is perpendicular to the adjustment path of the clamping jaws 130, 132 and the stop surface 162, wherein the support surface 164 transitions into the stop surface 162.

According to FIG. 9, the housing 10 can be connected to the mounting 124 so that the rear lateral surface 42 of the housing 12 runs along the stop surface 162 and the longitudinal lateral surface 16 of the housing 12 rests against the support surface 164. The housing 12 can then be fixed by means of a screw element penetrating the stop element 160, wherein upon tightening the screw element the rear lateral surface 142 rests in a planar fashion against the stop surface 162. For this purpose, the stop element 160 comprises an appropriate bore 166, through which a screw element penetrates.

A corresponding fastening is shown in FIG. 9. To this end, the mounting 126 is connected to a wooden slat 168. The receiving region 18 runs vertically, so that the course of a laser beam extending in a horizontal plane can be determined.

To capture a laser beam extending in a vertical plane, according to the illustrations in FIGS. 7 and 8 the housing 12 is connected to the mounting 124 so that the front surface 14 is at an incline with respect to the horizontal, whereby the laser beam can be captured in the desired scope over the receiving region 18 and the display 20 can be read at the same time. For this purpose, the mounting 124 can be placed with the second longitudinal side 146 thereon on a base, wherein large-surface-area support is achieved by using, in addition to the second longitudinal lateral surface 146, the clamping jaws 130, 132 as support, which consequently together with the second longitudinal side 126 span a plane by means of which the mounting 124 can be supported on the base.

In the embodiment, the housing 12 further comprises two recesses 172, 174 in the left face 170, which run along a straight line that is inclined with respect to the front surface 14.

Protrusions 176, 178 extend from the stop element 160, or the stop surface 162 thereof, and run along a straight line perpendicular to the adjustment path of the clamping jaws 130, 132. When the housing 12 is oriented with respect to the mounting 124 so that the protrusions 176, 178 engage with the recesses 172, 174, the housing 112 is consequently inclined with respect to the support surface 164 and the plane spanned by the second longitudinal lateral surface 146 of the mounting 124, so that the desired inclined position of the front surface 14 for capturing the laser beam is provided, as is shown in FIGS. 7 and 8. Furthermore, there is the possibility for the housing 12 to be fixed by means of a screw element that penetrates the opening 166 of the stop element 160. For this purpose, the face 170 of the housing 12 has an appropriate internal thread.

In keeping with the arrangement of the protrusions 176, 178, the rear lateral surface 42 of the housing 12 comprises recesses, whereby a vertical orientation of the housing 12 is possible when seated against the stop surface 162.

The invention claimed is:

1. A device for capturing a laser beam spanning a plane, said device comprising:
   a receiver unit comprising a housing with an upper surface, a rear surface opposite said upper surface, and a side surface perpendicular to said upper surface;
   a measuring area comprising a sensor disposed on said upper surface;
   a mounting detachably connected to the housing; said mounting comprising a polygonal-shaped base body having a longitudinal surface and an end surface;
   first and second clamping jaws disposed on said base body,
   wherein said clamping jaws are adjustable relative to each other;
   wherein each of said first and second clamping jaws has a clamping surface that is parallel to the end surface of the base body;
   a stop element defined by the end surface of the base body, or a section of the base body that forms a support surface, and a stop surface that extends perpendicularly from the end surface of the base body;
   a means for fastening the mounting to the receiver unit;
   wherein, in a first position, the upper surface or the rear surface of the housing rests against the stop surface, and the side surface of the housing rests against the end face of the mounting, or against the support surface, wherein said first position is fixed using the fastening means;
   wherein, in a second position, the side surface of the housing contacts the stop surface, such that the upper surface of the housing is at an incline with respect to the clamping surfaces of the clamping jaws.

2. The device according to claim 1, wherein the base body has a hollow cube geometry comprising an open. longitudinal side, along which the clamping jaws are adjusted relative to one another.

3. The device according to claim 1, wherein at least two protrusions extend from the stop surface, which are associated with recesses in the face of the housing.

4. The device according to claim 3, wherein the recesses run along a first straight line and the protrusions run along a second straight line, wherein the straight lines are oriented with respect to one another so that the front surface of the housing is inclined with respect to the clamping surfaces of the clamping jaws when the protrusions are engaged with the recesses.

5. The device according to claim 4, wherein the first straight line is inclined with respect to the upper surface of the housing.

6. The device according to claim 1, wherein, when the side surface of the housing rests against the stop surface, the housing is connectable to the stop element by means of a connecting element that penetrates the stop element.

7. The device according to claim 1, further comprising a marking that is perpendicular to the upper surface; said marking being disposed on at least one longitudinal surface of the housing, wherein the marking is surrounded by a marking element, that can be folded out of the longitudinal lateral surface, or wherein a corresponding marking element is associated with the marking.

8. A device for capturing a laser beam spanning a plane, said device comprising:
   a receiver unit comprising a housing with an upper surface, a rear surface opposite said upper surface, and a side surface perpendicular to said upper and rear surfaces;
   a measuring area comprising a sensor disposed on said upper surface;
   a mounting detachably connected to the housing; said mounting comprising a pentagon-shaped base body in cross section having first, second, and third longitudinal surfaces, an outer lateral surface, and a longitudinal ledge, and having first and second end surfaces;
   first and second clamping jaws disposed on said base body,
   wherein said clamping jaws are adjustable relative to each other;
   wherein each of said first and second clamping jaws has a clamping surface that is parallel to the second end surface of the base body, or to a section of the base body that forms a support surface;
   wherein the first, second, and third longitudinal surfaces extend between said first and second end surfaces of the base body in planes perpendicular to the second end surface of the base body, or to the support surface;
   wherein the first and second clamping jaws are adjustable along the first longitudinal surface of the base body;
   wherein each of the clamping jaws has an outer surface that is perpendicular to the clamping surfaces;
   wherein said outer surface of the clamping jaws extends in a plane parallel to the second longitudinal surface of the base body;
   wherein the longitudinal ledge extends in a transition region between the second and third longitudinal surfaces of the base body;
   wherein the outer lateral surface extends in a transition region between the first and third longitudinal surfaces of the base body;

wherein the third longitudinal surface of the base body forms an acute angle with the second longitudinal surface of the base body;

wherein the third longitudinal surface is a contact surface;

wherein the rear surface rests against the contact surface of the third longitudinal surface and the side surface contacts the longitudinal ledge.

9. The device according to claim 8, further comprising a stop element having a stop surface, said stop element extending from the base body, said stop surface being perpendicular to the first longitudinal surface of the base body, or the support surface, and delimited thereby, wherein, when the housing is connected to the mounting, the upper surface, or rear surface, rests against the stop surface, and rests with the side surface against the first longitudinal surface, or the support surface, and is fixable thereto by means of a fastening means extending from the stop element.

10. The device according to claim 9, wherein the stop element is a section of one of said clamping jaw, said section extending in a stationary manner from the base body.

11. The device according to claim 8, wherein the ledge is parallel to the first longitudinal surface.

12. The device according to claim 8, wherein the base body, in a sectional view, substantially has a non-isosceles trapezoid geometry, wherein the first longitudinal surface is a first lateral leg, the second longitudinal surface is a long base, and the third longitudinal surface is a second lateral leg.

13. The device according to claim 8, wherein the second and third longitudinal surfaces form an angle $\alpha$, with $20° \leq \alpha \leq 70°$.

14. The device according to claim 13, wherein the angle $\alpha$ is defined as $30° \leq \alpha \leq 60°$.

15. The device according to claim 8, further comprising a marking that is perpendicular to the upper surface; said marking being disposed on at least one longitudinal, surface of the housing, wherein the marking is surrounded by a marking element, that can be folded out of the longitudinal lateral surface, or wherein a corresponding marking element is associated with the marking.

16. The device according to claim 8, wherein said ledge extends between said first and second end surfaces of the base body.

17. The device according to claim 8, wherein said ledge is a longitudinal ledge.

18. The device according to claim 8, further comprising a screw element penetrating said first end surface of the base body.

19. The device according to claim 18, wherein said clamping jaws are adjustable relative to each other by said screw element.

20. A mounting for detachably connecting to a device for capturing a. laser beam spanning a plane, said mounting comprising a pentagon-shaped base body in cross section having first, second, and third longitudinal surfaces, an outer lateral surface, and a longitudinal ledge, and having first and second end surfaces;

first and second clamping jaws disposed on the first longitudinal surface of the base body, wherein said clamping jaws are adjustable relative to each other;

wherein each of said first and second clamping jaws has a clamping surface that is parallel to the second end surface of the base body, or to a section of the base body that forms a support surface;

wherein the longitudinal ledge extends in a transition region between the second and third longitudinal surfaces of the base body;

wherein the outer lateral surface extends in a transition region between the first and third longitudinal surfaces of the base body;

wherein the third longitudinal surface of the base body forms an acute angle with the second longitudinal surface of the base body;

wherein the first, second, and third longitudinal surfaces extend between said first and second end surfaces of the base body in planes perpendicular to the second end surface of the base body;

wherein a rear surface of the device rests against the third longitudinal surface of the mounting.

* * * * *